Aug. 10, 1954

J. F. SHIRK 2,686,093

PISTON RING

Filed March 30, 1951

INVENTOR.
John F. Shirk,
BY
Davis, Lindsey, Hibben & Noyes
Atty's.

Aug. 10, 1954
J. F. SHIRK
2,686,093
PISTON RING
Filed March 30, 1951
3 Sheets-Sheet 2
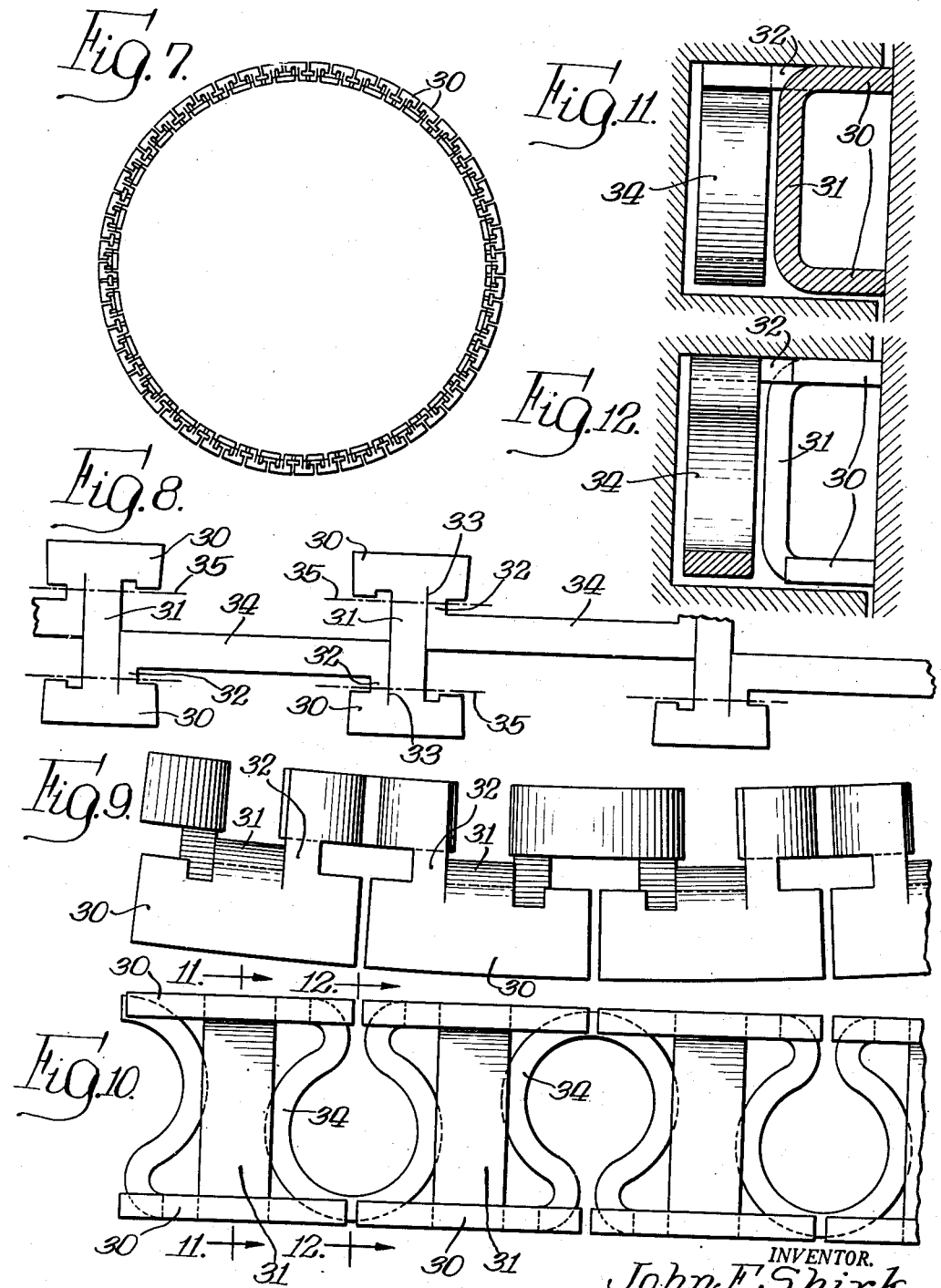
INVENTOR.
John F. Shirk,
BY
Davis, Lindsey, Hibben & Noyes
Attys.

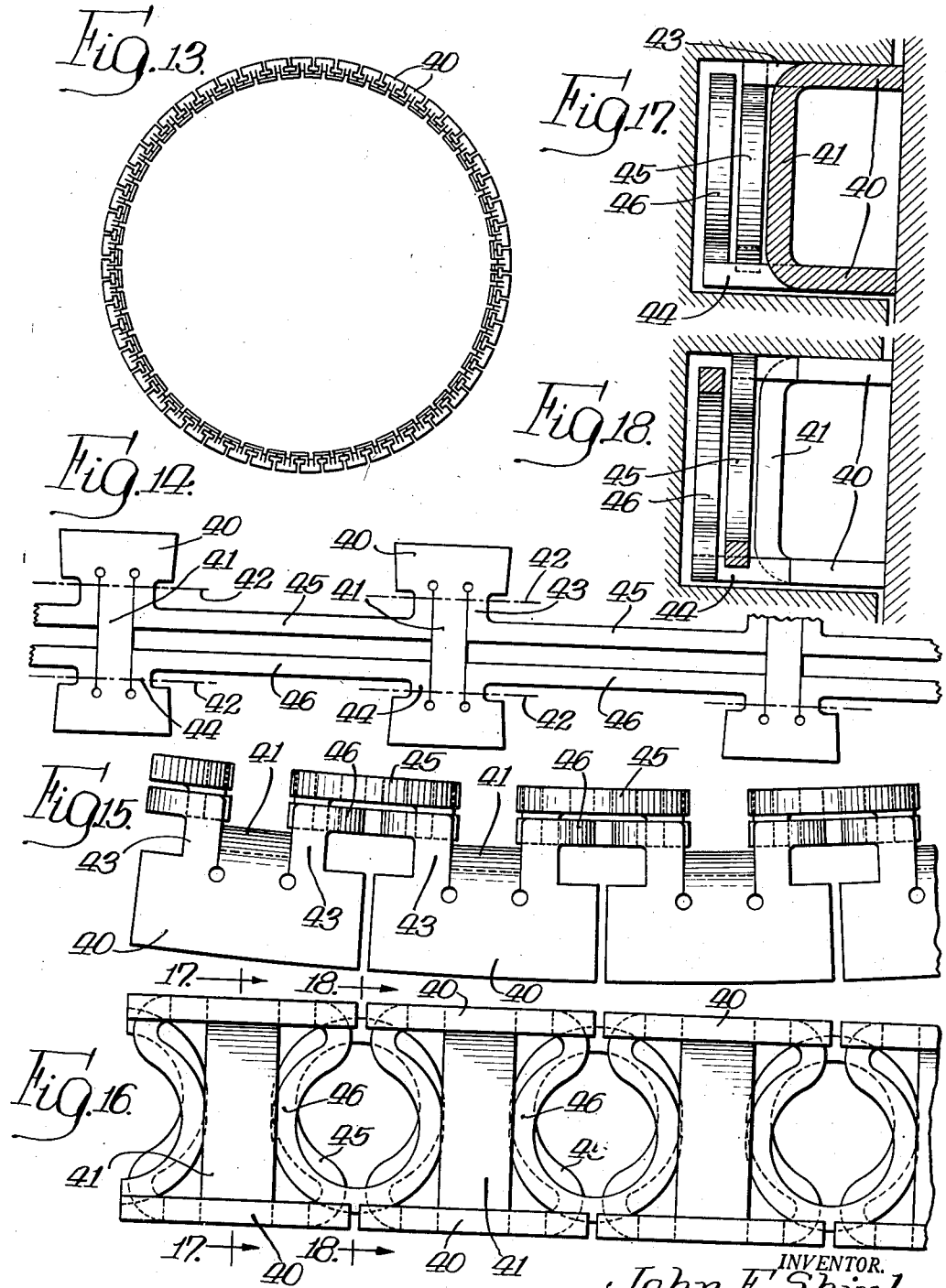

Patented Aug. 10, 1954

2,686,093

UNITED STATES PATENT OFFICE 2,686,093

PISTON RING

John F. Shirk, Hagerstown, Ind., assignor to Perfect Circle Corporation, Hagerstown, Ind., a corporation of Indiana Application March 30, 1951, Serial No. 218,452

25 Claims. (Cl. 309—44)

1

The invention relates generally to piston rings and more particularly to a piston ring made of sheet metal.

The general object of the invention is to provide a piston ring made of sheet metal and comprising axially spaced rows of segments with the segments connected by a novel web structure adapted to cause the segments to bear uniformly against the cylinder wall.

Another object is to provide a novel sheet metal piston ring adapted for use as an oil ring and having openings which provide for free flow of oil radially through the ring.

A further object is to provide a novel sheet metal piston ring having circumferentially expansible means for expanding a segmental rail structure, which means has a wide range of action so that the rail structure is maintained under full outward pressure despite wear thereon.

Other objects and advantages will become apparent from the following description taken in connection with the accompanying drawings, in which:

Figure 7 is a plan view of another embodiment of the invention.

Figure 8 is a view on a larger scale of a portion of the strip of metal from which the ring of Figure 7 is made.

Figure 9 is a fragmentary plan view on a still larger scale of the ring shown in Figure 7.

Figure 10 is a fragmentary elevational view of the ring shown in Figure 7.

Figure 11 is a sectional view taken on the line 11—11 of Figure 10 and showing the ring mounted in a piston in a cylinder.

Figure 12 is a sectional view similar to Figure 11 but taken on the line 12—12 of Figure 10.

Figure 13 is a plan view of still another embodiment of the invention.

Figure 14 is a view on a larger scale of a portion of the strip of metal from which the ring of Figure 13 is made.

2

Figure 15 is a fragmentary plan view on a still larger scale of the ring shown in Figure 13.

Figure 16 is a fragmentary elevational view of the ring shown in Figure 13.

Figure 17 is a sectional view taken on the line 17—17 of Figure 16 and showing the ring mounted in a piston in a cylinder.

Figure 18 is a sectional view similar to Figure 17 but taken on the line 18—18 of Figure 16.

A piston ring embodying the features of the invention is formed from a strip of sheet metal which is first punched and cut to provide various parts of the ring, and is then folded and formed into a circle. Generally, the ring comprises a pair of axially spaced rows of segments for engaging the cylinder wall with the segments in one row connected to segments in the opposite row by integral portions spaced inwardly from the outer periphery of the ring and with resilient means for connecting the segments circumferentially, which tend to expand the ring circumferentially and thus hold the segments against the cylinder wall with the desired pressure. Because of the flexibility of the ring, it readily conforms to the shape of the cylinder in which it operates and the segments all bear against the cylinder wall with substantially uniform pressure. The integral portions connecting the segments in the two rows and the resilient means connecting the segments circumferentially provide an open structure between the two rows of segments, which permits the oil scraped from the cylinder wall by the segments to readily pass to the inner part of the ring groove for return to the crankcase of the engine through the usual passages from the groove to the interior of the piston.

Figure 1:
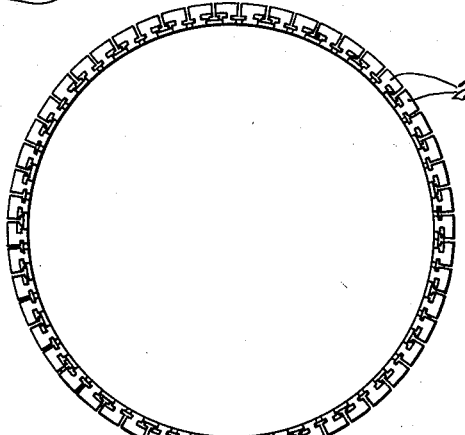
Figure 1 is a plan view of a piston ring embodying the features of the invention.
Figure 5:
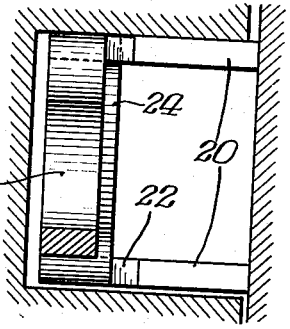
Figure 5 is a sectional view taken on the line 5—5 of Figure 4 and showing the ring mounted in a piston in a cylinder.
Figure 6:
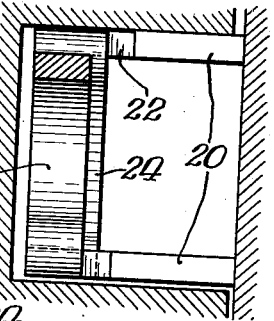
Figure 6 is a sectional view similar to Figure 5 but taken on the line 6—6 of Figure 4.
Figure 2:
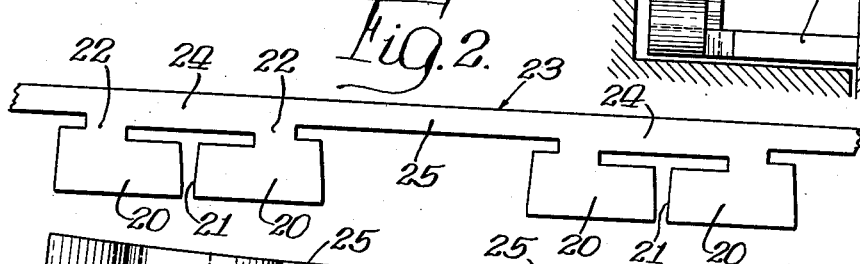
Figure 2 is a view on a larger scale of a portion of the strip of metal from which the ring is made.
Figure 3:
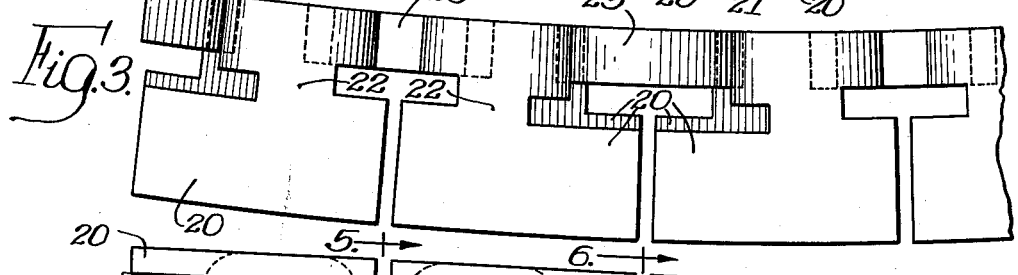
Figure 3 is a fragmentary plan view of the ring on a still larger scale.
Figure 4:
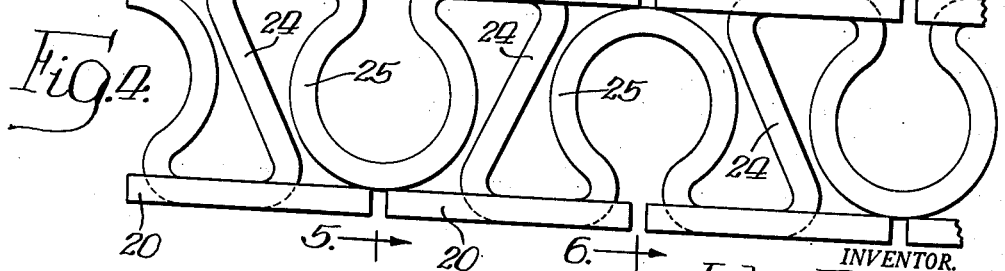
Figure 4 is a fragmentary elevational view of the ring.

In Figures 1 to 6, inclusive, there is illustrated one embodiment of the invention, formed from a strip of sheet metal which is punched and cut in the manner shown in Figure 2. This results in a strip comprising a plurality of segments 20 located along one edge of the strip and arranged in pairs which are relatively widely spaced longitudinally of the strip. The segments of each pair are separated by a relatively small space indicated at 21. Extending inwardly from the segments 20 transversely of the strip are arms 22 connected by a continuous portion, indicated at 23, extending longitudinally of the strip. The continuous portion 23 comprises relatively short portions 24 connecting the arms 22 of the segments of each pair, and relatively long portions 25 connecting the pairs of segments.

To form the strip, as shown in Figure 2, into a ring, the strip is bent along lines extending transversely of the strip to place the segments in two rows and to bring them close together in each row. Thus, the short portions 24 are bent at their juncture with the arms 22 along lines constituting the side edges of the arms, the bends at opposite ends of each portion 24 being in the opposite direction. Such bending is through an angle somewhat greater than 90° so that the segments of each pair are axially aligned with each other. Each short portion 24 thus constitutes a strut connecting the segments of each pair, and each strut with its connected segments may be said to constitute a section, the struts 24 extending at an angle to an axial direction in the finished ring.

The longer portions 25 are also bent along lines extending transversely of the strip at the juncture of the portions 25 with the arms 22. Each longer portion, in addition to being bent as stated, is also formed into a loop which is circular about an axis extending radially of the ring, as clearly shown in Figure 4, the loops connecting the sections circumferentially and being located between the planes of the two rows of segments. The loops 25 serve as spring members tending to expand the ring circumferentially to hold the segments against the cylinder wall with the desired pressure.

The radial widths of the struts 24 and the loops 25 may be such as best suited to perform the functions of the respective parts. Thus, the width of the struts 24 should be such as to properly support the associated segments. The width of the loops 25 should be such as to provide the desired pressure exerted by the ring against the cylinder wall. In the present instance, the struts 24 are shown as being slightly wider than the loops.

With a ring formed in this manner, it will be noted that the loops and struts alternate with each other. The loops also extend alternately from the upper and lower rows of segments, while the struts are slanted alternately in opposite directions. The struts and loops are located at the inner periphery of the ring, in the present form, but it is of course obvious that the struts and loops could be formed from portions of the segments intermediate the inner and outer peripheries.

The embodiment of the invention shown in Figures 7 to 12, inclusive, is similar to that shown in Figures 1 to 6. Thus, it comprises a plurality of sections circumferentially connected by spring loops which tend to expand the ring circumferentially. Each section comprises a pair of axially spaced segments but, instead of being connected by struts as in the first form, the segments are connected by web members as more fully described hereinafter.

This form of ring is also formed from a strip of sheet metal which is cut and punched in the manner shown in Figure 8 to provide two rows of segments 30 respectively located at opposite edges of the strip, the segments at one edge being directly opposite the segments at the opposite edge. Connecting the opposite segments are integral portions 31 which in the finished ring constitute the web members. The segments are provided at their inner edges with short arms 32 located at one side of the portions 31 and separated therefrom by shear cuts indicated at 33 (see Figure 8). Connecting the arms 32 of adjacent segments are longitudinally extending portions 34 which are bent to form the spring loops connecting the sections. It will be noted in Figure 8 that the portions 34 are staggered, that is, they are alternately connected to segments at opposite sides of the strip.

To form the ring from the strip illustrated in Figure 8, the segments are bent at right angles to the portions 31 on longitudinally extending lines, indicated in Figure 8 by dot and dash lines 35, which are located substantially at the juncture of the segments with the portions 31. This results in forming U-shape sections each comprising a pair of segments 30 connected by a portion 31 constituting a web member. The arms 32, however, remain in the same planes with their associated segments.

The longitudinally extending portions 34 are bent on lines extending transversely of the strip at their juncture with the arms 32 and are formed into loops which are circular about an axis extending radially of the ring, as shown in Figure 10, to provide spring members circumferentially connecting the respective sections. The loops are located at the inner periphery of the finished ring and, since they are alternately connected to segments at opposite sides of the strip before bending, they will extend alternately from the top and bottom of the ring as shown in Figure 10. With the loops located at the inner periphery of the ring, they may extend into the planes of the segments but preferably are slightly spaced from the outer faces of the segments so that, in grinding such outer faces, no metal will be removed from the loops to weaken them at that point.

With this construction, the ring may be said to comprise a plurality of sections, each comprising a pair of axially spaced segments 30 connected by a web member 31.

The sections are connected by the loops 34 located inwardly of the web members 31 and connected to the sections by the arms 32 extending inwardly from the segments at one side of the web members. The loops, as in the case of the first-described form, function to expand the ring circumferentially and thus cause the segments to bear against the cylinder wall.

The form of ring shown in Figures 13 to 18, inclusive, is quite similar to the form shown in Figures 7 to 12 but differs therefrom by having two loops connecting each pair of sections circumferentially. To form this ring, a blank shown in Figure 14 is first provided. This blank comprises a strip of metal punched and cut to provide pairs of segments 40 at opposite edges of the strip. The segments 40 are connected by portions 41 extending transversely of the strip which are bent at right angles to the segments along the dash and dot lines indicated at 42 to form the U-shape sections. The strip also includes arms 43, a pair of which extend inwardly from each segment on one side of the strip at opposite sides of the web member 41. Similar arms 44 extend inwardly from the segments at the opposite side of the strip. The arms 43 of adjacent segments are connected by longitudinally extending portions 45 and the arms 44 of adjacent segments are connected by longitudinally extending portions 46. The two sets of portions 45 and 46 are bent relatively to their associated arms and are formed into circular loops as shown in Figure 16.

The loops 45 and 46 in the completed ring extend from the plane of one row of segments to the plane of the other row of segments and, since both sets of loops are located inwardly of the web members connecting the segments, loops 45 and 46 overlap each other. To permit such overlapping, the arms of one set are made longer than the arms of the other set. Thus, in the present instance, the arms 43 are longer than the arms 44, so that the loops 45 connected to the arms 43 will be located radially inside of the loops 46 connected to the arms 44.

With this construction, the circumferential expansion of the ring is effected by both the loops 45 and the loops 46. Since the two sets of loops are respectively connected to opposite sides of the ring, the expanding force exerted by the loops at the two sides of the ring will be substantially equal so that there will be no tendency to tilt the sections. Because there are two loops exerting an expanding force between each pair of adjacent sections, each loop may be substantially narrower in radial width than in the case of the single loop form shown in Figures 7 to 12. The width chosen, however, is determined by the amount of pressure it is desired to have the ring exert on the cylinder wall.

I claim:

1. A piston ring comprising two axially spaced rows of cylinder engaging segments, means for connecting the segments in one row with those in the other row, and means for connecting the segments circumferentially including a plurality of loops located radially inward from the segments at the inner periphery of the ring.

2. A piston ring comprising two axially spaced rows of cylinder engaging segments and means for connecting the segments comprising a plurality of members connecting the segments of one row with the segments of the other row, and a plurality of loops connecting the segments in each row and located radially inward from the segments at the inner periphery of the ring.

3. A piston ring comprising a plurality of sections each comprising a pair of axially spaced segments and a member integrally connecting the segments, and means connecting said sections comprising loops located radially inward from the segments at the inner periphery of the ring.

4. A piston ring comprising two axially spaced rows of segments, web members connecting the segments in one row with those in the other row, and spring structure located radially inward from the web members and connecting the segments circumferentially.

5. A piston ring comprising two axially spaced rows of segments having integral connections for connecting one row with the other, and integral connections for connecting the segments circumferentially, the last-mentioned connections being located radially inward from the first-mentioned connections.

6. A piston ring comprising a plurality of sections each comprising a pair of axially spaced segments and a member connecting the segments, and means connecting said sections comprising circular loops located at the inner periphery of the ring, each being formed about an axis extending radially of the ring.

7. A piston ring comprising two axially spaced rows of segments, web members extending inwardly from said segments for connecting the segments in one row with those in the other, and loops for connecting the segments circumferentially and having portions extending inwardly from said segments separately from said web members.

8. A piston ring comprising two axially spaced rows of segments, web members extending inwardly from said segments and connecting the segments in one row with those in the other, arms extending inwardly from said segments at the sides of said web members, and loops connecting the arms of adjoining segments.

9. A piston ring comprising two axially spaced rows of segments, each segment having a web member and an arm extending side-by-side inwardly from the segment, the web members connecting the segments in one row with those in the other, and loops extending from said arms for connecting the segments circumferentially.

10. A piston ring comprising a plurality of sections each comprising a pair of axially spaced segments and a member connecting the segments, and means connecting the sections comprising arms extending inwardly beyond said members, and loops connecting said arms.

11. A piston ring comprising a plurality of sections each comprising a pair of axially spaced segments and a member connecting the segments, and means connecting the sections comprising arms extending inwardly beyond said members, and loops extending axially from said arms and located between the planes of said segments.

12. A piston ring comprising a plurality of pairs of segments with the segments of each pair axially spaced, a web member connecting each pair of segments and extending from the inner edges of the segments, arms extending from the inner edges of the segments adjacent the web members, and loops connecting said arms.

13. A piston ring comprising a plurality of sections, each comprising a pair of axially spaced segments and a web member connecting the segments, and means connecting said sections comprising a plurality of loops located at the inner periphery of the ring, said loops connecting circumferentially adjacent segments and extending alternately from upper and lower segments.

14. A piston ring comprising upper and lower segments, web members extending axially and connecting the upper and lower segments, and loops connecting circumferentially adjacent segments and extending alternately from upper and lower segments, said loops being located radially inward from said web members.

15. A piston ring comprising a plurality of sections, each comprising a pair of axially spaced segments and a web member connecting the segments, a pair of loops connecting each section with each adjoining section, the loops of each pair being in overlapping relation with each other and being located radially inward from said web members.

16. A piston ring comprising a plurality of pairs of segments with the segments of each pair axially spaced from each other, a web member connecting each pair of segments, a pair of arms extending from each segment, and loops connecting said arms, each web member being interposed between the arms of the associated segment.

17. A piston ring comprising a plurality of pairs of segments with the segments of each pair axially spaced from each other, a web member connecting each pair of segments and extending axially therefrom, a pair of arms extending radially inward from each segment at the respective sides of the associated web member, and loops connecting said arms.

18. A piston ring comprising two axially spaced rows of cylinder engaging segments, members integrally connecting the segments in one row with those in the other and folded on lines extending radially of the ring, and loop members connecting adjoining segments in each row.

19. A piston ring comprising two axially spaced rows of segments, each segment having a portion of reduced width spaced inwardly from the outer periphery of the ring, and each of such portions having a member extending from one side thereof for connecting it with a portion in the opposite row and having another member extending from the opposite side thereof for connecting it with the portion for the adjoining segment.

20. A piston ring comprising two axially spaced rows of segments, struts connecting the segments in one row with those in the other and tilted at an angle to the axial direction, and loops connecting adjoining segments in each row.

21. A piston ring comprising a plurality of sections, each section comprising a pair of axially spaced segments and a strut connecting said segments, the struts in adjoining sections slanting toward each other, and loops connecting adjoining sections and located between the struts.

22. A piston ring comprising two axially spaced rows of segments, each segment having a portion spaced inwardly from the outer periphery of the ring, from which is bent on a radial line a strut extending to the opposite segment in the other row, and a loop connected to an adjoining segment.

23. A piston ring comprising a continuous strip of sheet metal bent transversely of the strip to form alternate loops and struts, and segments extending laterally from the strip and aligned in two axially spaced rows.

24. A piston ring comprising a continuous strip of sheet metal bent transversely of the strip to form alternate loops and struts with portions between the loops and struts arranged in two axially spaced rows, and segments extending from said portions.

25. A piston ring comprising a continuous strip of sheet metal bent transversely of the strip to form alternate loops and struts with portions between the loops and struts arranged in two axially spaced rows, said portions together with said loops and struts being located at the inner periphery of the ring, and segments extending outwardly from said portion to form a pair of axially spaced cylinder engaging flanges.

References Cited in the file of this patent

UNITED STATES PATENTS

| Number | Name | Date |
| --- | --- | --- |
| 2,267,369 | Bowers | Dec. 23, 1941 |
| 2,346,897 | Bowers | Apr. 18, 1944 |
| 2,355,772 | Zahodiakin | Aug. 15, 1944 |
| 2,397,636 | Zahodiakin | Apr. 2, 1946 |
| 2,426,385 | Bowers | Aug. 26, 1947 |